March 2, 1926.
F. BENSON
EGG BEATER
Filed May 26, 1924
1,575,090
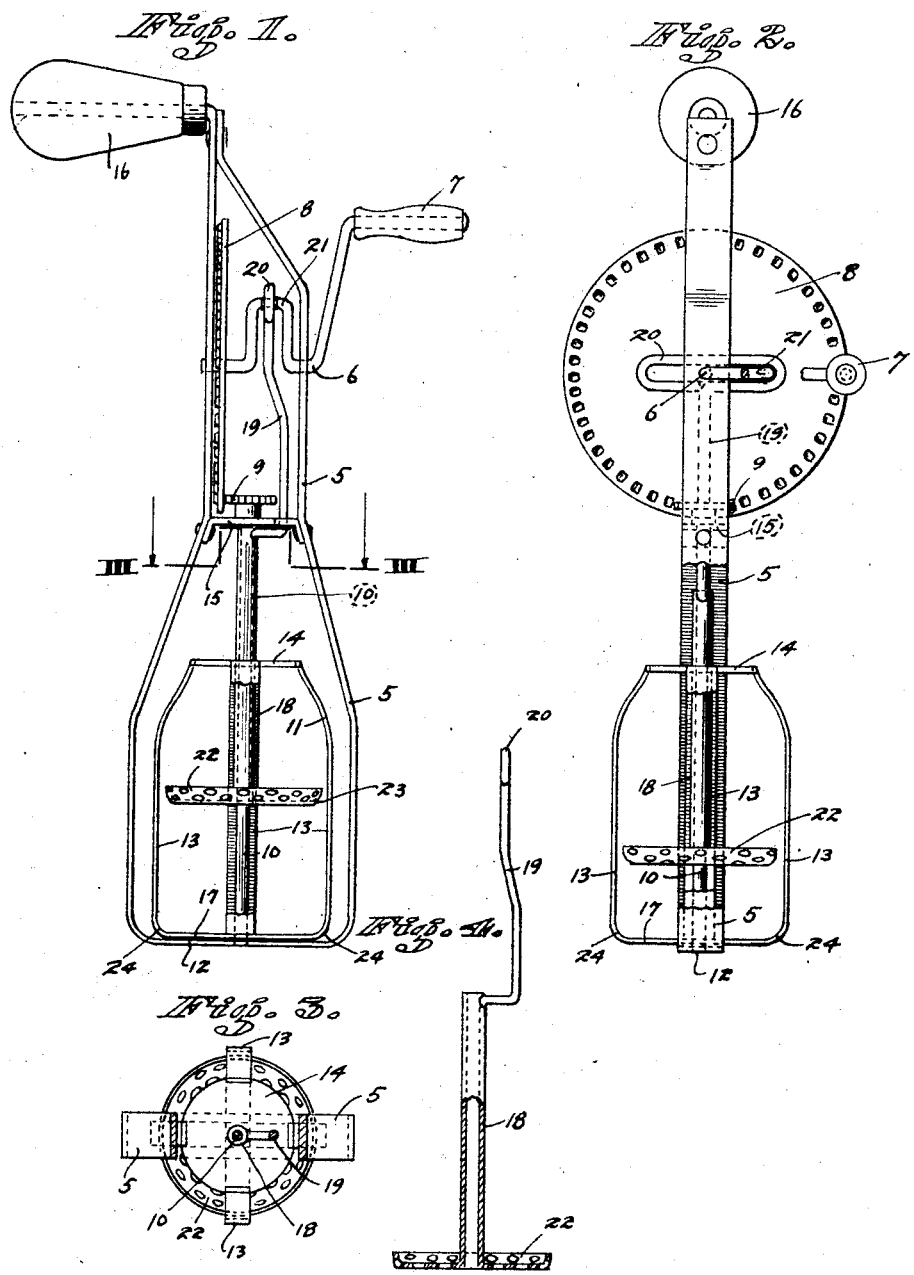
INVENTOR.
FREDERICK BENSON
BY
ATTORNEYS.

Patented Mar. 2, 1926.

1,575,090

UNITED STATES PATENT OFFICE.

FREDERICK BENSON, OF SAN FRANCISCO, CALIFORNIA.

EGG BEATER.

Application filed May 26, 1924. Serial No. 715,992.

*To all whom it may concern:*

Be it known that I, FREDERICK BENSON, a citizen of the United States, and a resident of San Francisco, county of San Francisco, State of California, have invented a new and useful Egg Beater, of which the following is a specification.

This invention relates to egg beaters and has for its primary object the provision of a device of this character including a battery of co-acting agitators and means for controlling action thereof to render the device highly effective.

Heretofore it has not been possible to cause the agitator of a beater to entrench itself or become submersed in a shallow body of liquid or matter to be agitated to the extent that the process of agitation can be carried on with dispatch and thoroughness. This is particularly true when it is desired to whip the constituents of a small measure of mayonnaise; a single egg or a small quantity of cream or other matter when placed in a cup or suitable receptacle, it being found that the effective agitating surfaces are not brought into close enough contact with the matter as will set up agitation. My invention is, therefore, designed to overcome the aforesaid difficulties and objections and make it possible to accelerate the agitating process under all conditions.

Broadly, it is the object of the invention to provide an improved egg beater having features of structural superiority and functional advantage.

Other objects and advantages will be noted hereinafter in connection with the following description of the accompanying drawings, which illustrate a preferred embodiment of the invention, and wherein:

Figure 1 is a view in side elevation of the device with parts broken away for the purpose of clearness.

Figure 2 is a view looking at right angles to Figure 1.

Figure 3 is a section on line 3—3 of Figure 1, and

Figure 4 is a side view of the reciprocating agitator showing parts in section.

In carrying the invention into practice, I employ a suitable frame (5) wherein is journaled for rotation a crank shaft (6) having a manipulating handle (7). On this shaft is a fixed gear wheel (8) which meshes with a small driven gear wheel (9) on the vertical shaft (10) of a revolving agitator or beater (11). The lower end of the shaft (10) is arranged in a bearing portion (12) at the base of the frame (5), and as shown, said portion (12) is substantially flat. The agitator (11) is provided with a suitable number of side arms (13) which form agitating surfaces. The upper ends of these arms are joined to a flat metal disk (14) through the center of which passes the shaft (10). A bearing bracket (15) on the frame (5) serves to steady operations of the shaft and it holds its gear (9) in mesh with the gear (8). The upper end of the frame (5) carries a handle (16) adapted to be held in one hand of the operator as the crank shaft (6) is actuated. The side arms (13) of the agitator (11) are joined together at their lower ends by a cross bar (17) which extends in parallel relation to the base (12) of the frame (5) so that the parts are brought close together with just enough clearance to permit the agitator (11) to properly function.

Working on the shaft (10) as a guide, is a reciprocating sleeve (18) having a fixed arm (19) whose upper end is formed to provide an oval shaped loop or link (20) through which the crank bar (21) of the shaft (6) passes so as to coact with the link as said shaft is turned and thereby convert rotary motions of the shaft into reciprocating motions of the sleeve (18). The lower end of the sleeve (18) carries a perforated cupped agitator (22) whose bottom wall is parallel with respect to the base (12) and bar (17). The throw of the sleeve is calculated so that the base (12) comes almost against the bar (17) when the agitator is at its lowest limit of movement. This brings all these parts into such relation as will cause them to be covered by a relatively shallow body of liquid and on the upward motion of the agitator (22) the liquid is lifted and thrown into the effective agitating presence of the arms (11).

I have now combined a rotary agitator with a reciprocating agitator and have brought about a relation of the parts that will cause the work of agitation to be accelerated and carried on with dispatch and thoroughness.

The device is simple of construction, being composed of few operating parts and the order of their arrangement is conducive to reliability of their action under all conditions. I find that by providing the upper surface of the agitator with a shallow or cup part, a greater spread of the liquid is had on the up stroke of the agitator and I preferably curve the sides of the agitator in an upward direction at (23) to agree with the bends (24) of the arms (11) at their joinder with the bar (17). This also permits the agitator to become covered by the liquid to be agitated when the level of the liquid is low.

I claim:

1. A beater comprising an open frame allowing the material to be beaten to readily flow therethrough transversely thereof, a rotary agitator, means for throwing matter to be agitated into the presence of the agitating surfaces of the agitator, and mechanism for operating said means and the agitator simultaneously, said means operating inwardly of the path of rotation of said agitator and being of perforated cup form adapted when moved to an extreme lower position to be disposed at the extreme base of the rotary agitator.

2. A beater comprising an open frame allowing the material to be beaten to readily flow therethrough transversely thereof, a rotary agitator, means for throwing matter to be agitated into the presence of the agitating surfaces of the agitator, and mechanism for operating said means and the agitator simultaneously, said means consisting of a reciprocating perforated cupped agitator working in parallelism with the base of the rotary agitator and adapted on its down stroke to reach the base of said rotary agitator.

3. A beater comprising an open frame allowing the material to be beaten to readily flow therethrough transversely thereof, a rotary agitator, a perforated cupped reciprocating agitator, means to cause downward movement of the reciprocating agitator to a point at the extreme lower end of the rotary agitator, and means for simultaneously actuating both of said agitators.

4. An egg beater comprising a frame, a rotary agitator having parallel side arms, a reciprocating agitator operating between the arms of the rotary agitator, a shaft for the rotary agitator, a frame supporting both agitators and provided with a bearing bracket in which said shaft is journaled, a sleeve carried by the reciprocating agitator, a power transmitting arm carried by the sleeve and freely movable through the bracket so as to secure the sleeve against rotation, means for conveying motion to the arm and to the shaft, the reciprocating agitator carrying a perforated cup whose bottom wall is parallel to the base of the rotary agitator so that at the extreme down stroke of the reciprocating agitator, said bottom wall will be at the extreme base of said reciprocating agitator.

FREDERICK BENSON.